(12) United States Patent
Groell et al.

(10) Patent No.: US 9,065,492 B2
(45) Date of Patent: Jun. 23, 2015

(54) PROBE SYSTEM AND METHOD FOR OPERATING A PROBE SYSTEM

(71) Applicant: DR. JOHANNES HEIDENHAIN GMBH, Traunreut (DE)

(72) Inventors: Klaus Groell, Waging am See (DE); Christian Eisenberger, Ruhpolding (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 77 days.

(21) Appl. No.: 13/929,178

(22) Filed: Jun. 27, 2013

(65) Prior Publication Data
US 2014/0011444 A1    Jan. 9, 2014

(30) Foreign Application Priority Data
Jul. 4, 2012   (DE) .......................... 10 2012 211 612

(51) Int. Cl.
| H04B 7/24 | (2006.01) |
| H04B 7/02 | (2006.01) |
| H01Q 21/28 | (2006.01) |
| G01B 21/04 | (2006.01) |
| G01B 5/012 | (2006.01) |

(52) U.S. Cl.
CPC .................. *H04B 7/02* (2013.01); *H01Q 21/28* (2013.01); *G01B 21/047* (2013.01); *G01B 5/012* (2013.01); *G01B 2210/58* (2013.01)

(58) Field of Classification Search
USPC ........ 455/39, 135, 277.1, 277.2; 33/503, 558, 33/561; 343/893
See application file for complete search history.

(56) References Cited

U.S. PATENT DOCUMENTS

| 4,035,728 A | 7/1977 | Ishikawa et al. |
| 2011/0094117 A1* | 4/2011 | Groell .............................. 33/503 |

FOREIGN PATENT DOCUMENTS

| DE | 25 58 557 | 9/1976 |
| EP | 0 509 677 | 10/1992 |
| EP | 2 317 278 | 5/2011 |

OTHER PUBLICATIONS

S. Nethi, et al., "Time and Antenna Diversity in Wireless Sensor and Actuator Networks", IEEE 9th Malaysia International Conference on Communications, p. 932-937, Dec. 15-17, 2009.*
European Search Report, dated Aug. 29, 2013, issued in corresponding European Patent Application No. 13167841.9.

* cited by examiner

*Primary Examiner* — Tuan H Nguyen
(74) *Attorney, Agent, or Firm* — Kenyon & Kenyon LLP

(57) ABSTRACT

A probe system includes a probe and a transmission/reception element. The probe and the transmission/reception element are configured such that information is transmittable between them in wireless fashion via a radio signal. The transmission/reception element or the probe has two antennas, set apart from each other, for receiving the radio signal, so that the information received by the two antennas via the radio signal is able to be processed concurrently.

14 Claims, 3 Drawing Sheets

PROBE SYSTEM AND METHOD FOR OPERATING A PROBE SYSTEM

CROSS-REFERENCE TO RELATED APPLICATIONS

The present application claims priority to Application No. 10 2012 211 612.5, filed in the Federal Republic of Germany on Jul. 4, 2012, which is expressly incorporated herein in its entirety by reference thereto.

FIELD OF THE INVENTION

The present invention relates to a probe system and a method for operating a probe system. The probe system may include a probe having a stylus and a transmission/reception element, a wireless transfer of information being possible between the probe and the transmission/reception element.

BACKGROUND INFORMATION

A probe system normally includes a mobile probe and a stationary transmission/reception element. The probe in the form of a momentary-contact switch having a deflectable stylus, which outputs a signal upon deflection out of its rest position or in response to a contact of the stylus, is used, in particular, for determining the position of workpieces that are clamped in machines, e.g., machine tools, that process material. In this context, the rest position of the stylus should be understood to be a position in which the stylus has no contact with the workpiece to be probed. Upon contact of the stylus with the workpiece, the stylus is deflected out of its rest position, and an electrical sensor signal is generated by a suitable transducer if the deflection exceeds a specified probe threshold. The electrical sensor signal is then frequently converted into a radio signal, thereby permitting a contactless and wireless transmission of the probe-contact information to the transmission/reception element of the probe system.

The wirelessly transmitted signals are converted again into electrical signals in this transmission/reception element. The transmission/reception element of the probe system is connected to an evaluation unit, to which the electrical signals are relayed and evaluated and ultimately made available, for example, to the control of the machine tool. The position of the workpiece to be measured can then be determined there, based on the measured position of the machine tool part in question. In this connection, it is important that the pertinent information be transmitted reliably within a predetermined time window.

Thus, for example, the contour of a workpiece, and also the contour of a tool may be sensed by such a probe. In the case of sensing a workpiece, the probe is usually disposed so as to be movable relative to the transmission/reception element.

European Published Patent Application No. 2 317 278 describes a probe system, in which a wireless signal transmission or transmission of information via a radio signal is provided.

SUMMARY

Example embodiments of the present invention provide a probe system and a method for operating a probe system, by which reliable and simple operation of a probe system may be attained.

According to example embodiments of the present invention, a probe system includes a probe and a transmission/reception element, the probe having a stylus and a sensor element. Due to contact of the stylus, a sensor signal is able to be generated by the sensor element. The probe and the transmission/reception element are configured such that information is transmittable wirelessly between them via a radio signal. In order to receive the radio signal, the transmission/reception element or the probe (possibly also the transmission/reception element and the probe) has two antennas set apart from each other, the transmission/reception element or the probe being configured so that the information received by the two antennas via the radio signal is able to be processed concurrently.

The sensor element may be provided as a mechanically operating element, for example, as a strain gauge or a piezo element, or may be provided as an optically operating element, e.g., as a photoelement, in an optical system.

Radio signals should be understood to include signals in the form of modulated radio waves. The frequency band for radio waves may be, for example, between 100 MHz and 300 GHz. For example, the radio wave may have a frequency between 500 MHz and 30 GHz. In particular, the radio signals may be in the form of data frames according to the customary nomenclature in connection with the OSI layer model. The term processable may be understood, for example, as storable or evaluable or assessable.

Each of the two antennas may be connected to an electronic receiver circuit, so that the information received is processable concurrently in the receiver circuits. The receiver circuit may include an amplifier, a filter, or a demodulator, for example.

In particular, the probe and the transmission/reception element may be disposed in a manner allowing movement relative to each other.

The antennas may be placed at an angle relative to each other, e.g., not oriented along parallel lines relative to each other.

The antennas may be arranged within a closed housing. For example, the housing may be made leak-proof with respect to the surroundings. The spacing of the antennas may be selected to be greater than the half wavelength or equal to the half wavelength of the radio waves of the radio signals.

The electronic receiver circuits are disposed, for example, on two separate electronic modules, each of the modules additionally including an electronic transmitter circuit. In particular, the electronic modules may be denoted as radio transceivers. These modules may be arranged as separate chips (integrated circuits), especially identical chips. For example, one and the same transmitted radio signal having a frequency f (e.g., f=2.4 GHz) is receivable concurrently or simultaneously by two antennas set apart from each other. In particular, the electronic transmitter circuit may be implemented such that only radio signals on one frequency are able to be transmitted by it during the operation of the probe system. No synchronization of the beginning of transmission of a radio signal or data frame (transmitter side) to any receive window (receiver side) is necessary for the operation of the probe system. Therefore, information is thus transmittable in unsynchronized and wireless fashion via a radio signal between the probe and the transmission/reception element. In particular, this is achieved because the antennas and the associated receiver circuits are ready to receive, that is, are listening outside of their own transmission times. To be understood as own transmission times are those periods of time within which radio signals are transmitted by the antennas.

The information transmittable wirelessly via a radio signal includes readiness information or probe-contact information. The probe-contact information includes information as to whether the stylus is touching a body to be measured. For example, the information is transmittable from the probe to the transmission/reception element, so that at least the transmission/reception element has two antennas, set apart from each other, and associated receiver circuits for receiving the radio signal.

Radio signals are transmittable alternately by the two antennas, so that the radio signal is transmittable by only one antenna, while the other antenna is mute, and accordingly, transmits nothing. It may thus be provided that the radio signals are not transmitted simultaneously.

In addition, the probe system may be arranged such that a first level of the radio signal as received by the first antenna, and a second level of the radio signal as received by the second antenna are ascertainable in the transmission/reception element. In this case, the probe system has a comparator by which the first level may be compared to the second level. Radio signals are transmittable alternately by the two antennas, so that the radio signal is transmittable by only one antenna, while the other antenna is mute, the transmitting antenna being the antenna which delivers the higher level ascertained from the comparison carried out previously. Therefore, the respective received level of both antennas is thus ascertainable, so that it is possible to decide which of the antennas delivers better reception. This antenna is selectable for the following transmission.

A level may be formed from a logarithm of the ratio of a received power to a fixed predetermined power value. However, the term level may also mean other variables which are suitable as measure for the strength of the radio signal received.

According to example embodiments of the present invention, in a method for operating a probe system, information is transmitted wirelessly via a radio signal between the probe and the transmission/reception element. The transmission/reception element or the probe has two antennas, set apart from each other, for receiving the radio signal, so that the information received by the two antennas via the radio signal is processed concurrently.

The information may be in the form of readiness information or probe-contact information, and may be transmitted from the probe to the transmission/reception element.

Each of the two antennas may be connected to an electronic receiver circuit, so that the information received is processed concurrently in the receiver circuits. Hereinafter, to process may be understood in particular as to store or to evaluate or to assess.

Radio signals may be transmitted alternately by the two antennas, so that the radio signal is transmitted by only one antenna, while the other antenna is mute.

Furthermore, a first level of the radio signal as has been received by the first antenna may be ascertained, and a second level of the radio signal as has been received by the second antenna may be ascertained. Thereupon, the first level is compared to the second level, and radio signals are transmitted alternately by the two antennas, so that the radio signal is transmitted or emitted by only one antenna, while the other antenna is mute, that antenna which delivers the higher level ascertained from the comparison carried out beforehand being determined as the transmitting antenna.

For example, the magnitude of the respective received level or of the received signal strength is ascertained continuously during measuring operation, particularly upon each transmission of information.

The transmission power for the transmitting antenna may be determined as a function of the magnitude of the previously ascertained level of the radio signal received by the same antenna. This is accomplished in a manner that the transmission power is reduced in response to a level ascertained to be comparatively high.

In addition, a first level of the radio signal as received by the first antenna, and a second level of the radio signal as received by the second antenna may be ascertained in the transmission/reception element. The first level is then compared to the second level. Radio signals are then transmitted by one antenna to the probe, the radio signal transmitted to the probe containing information about the magnitude or the value of the higher of the ascertained levels. Thereupon, the transmission power of the probe is set as a function of the magnitude of the higher of the ascertained levels.

For example, the probe system and the method may permit reliable transmission of comparatively little information within a defined period of time, especially when the probe is changing its position continuously relative to the transmission/reception element. A redundancy, e.g., the multiple availability of the same information, is achievable by the use of two antennas and receiver circuits which operate concurrently. The reliability of the transmission of information may be further increased if additionally, signals are transmitted via light waves, so that in the event of complete interference of the radio signals, the information is still transmitted within the defined period of time.

Further features and aspects of example embodiments of the present invention are described in detail below with reference to the appended Figures.

DETAILED DESCRIPTION

Figure 1:
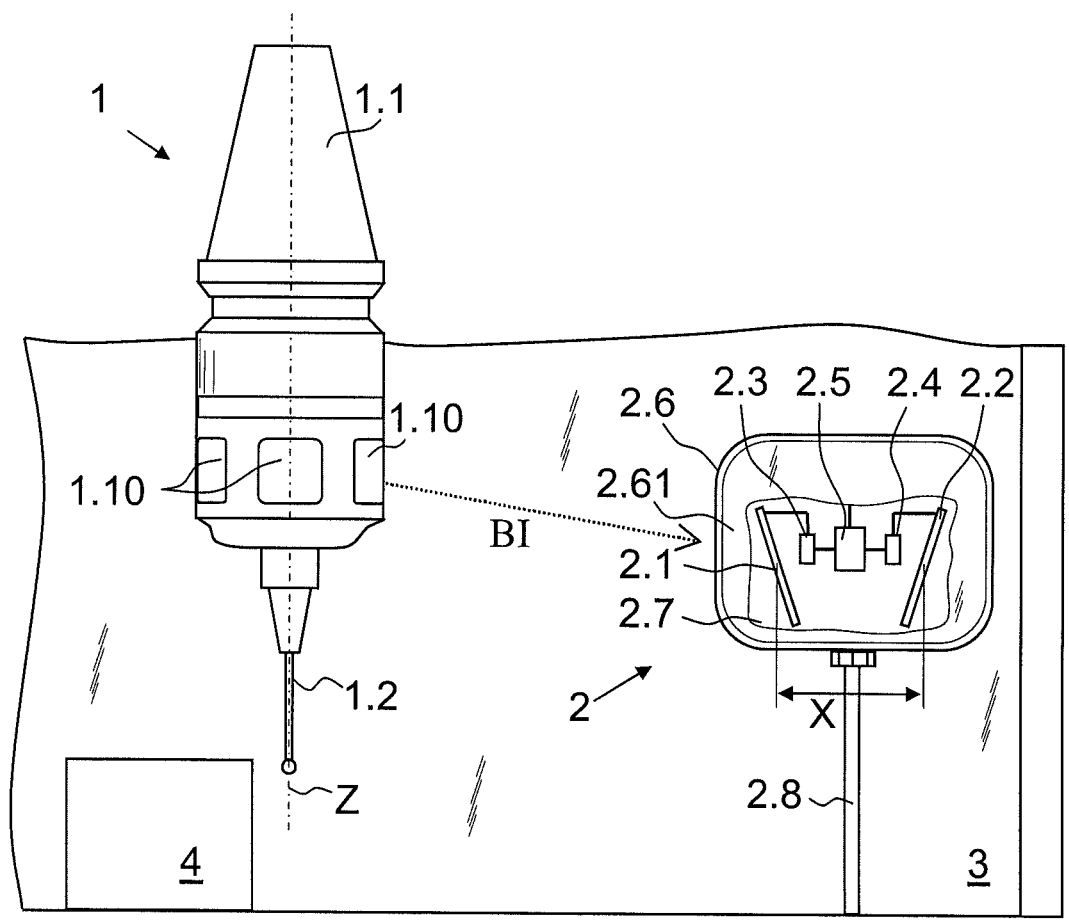
FIG. 1 is a side view of a probe system.

FIG. 1 illustrates a probe system that includes a probe 1 and a transmission/reception element 2. Probe 1 may be clamped into a spindle of a machine tool by a clamping cone 1.1. Longitudinal axis Z of probe 1 at the same time represents the center axis of clamping cone 1.1. Parallel and concentrically with respect to longitudinal axis Z, a cylindrical stylus 1.2, having a probe-contact sphere at one end, is provided on probe 1.

Figure 2:
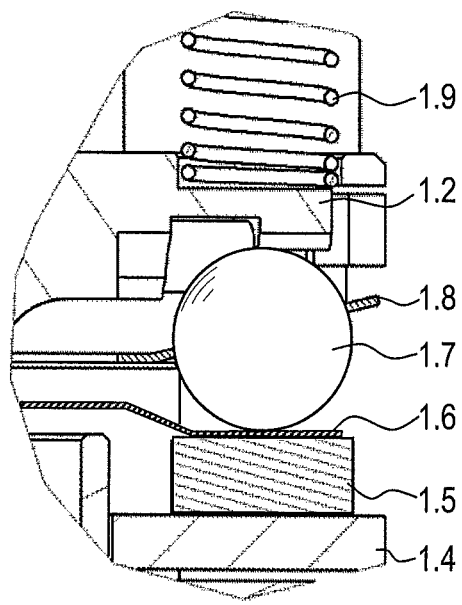
FIG. 2 is an enlarged view of a probe having a sensor element.

FIG. 2 is a partial view of the interior of probe 1. Placed on a printed circuit board 1.4 are a total of three pressure-sensitive sensor elements 1.5, of which only one is illustrated in FIG. 2. Disposed on the surface of each sensor element 1.5 is a diaphragm 1.6, which in each case is touched by a sphere 1.7, spheres 1.7 being fixed exactly at a predetermined position relative to sensor elements 1.5 by a holder 1.8. An arm of stylus 1.2, prestressed in each case by a spring 1.9, rests on each sphere 1.7. A battery is disposed in probe 1 to supply probe 1 with energy.

Probe 1 further has windows 1.10 which are transmissive both to light waves and to radio waves. According to FIG. 3, located within probe 1 is a transmitter/receiver unit 1.3. It has light sources 1.31 which are energized by the battery in probe 1 and are staggered over the periphery of probe 1. In the example illustrated, according to FIG. 3, six light sources 1.31 are provided on probe 1, each staggered by 60° along a circumferential line on probe 1. As illustrated schematically in FIG. 3, a CPU 1.32 located in probe 1 controls light sources 1.31. Here, they are able to emit light waves having a wavelength of, e.g., $\lambda_L$=880 nm. Incidentally, probe 1 may be sensor-less with respect to light waves, so that no signals based on light waves are able to be received by probe 1.

Also located in probe 1 is a radio transceiver 1.34 which has an electronic receiver circuit 1.341 and an electronic transmitter circuit 1.342. Radio transceiver 1.34 is arranged, e.g., as a single chip and is connected to an antenna 1.33. For example, antenna 1.33 is accommodated behind windows 1.10 as a circumferential wire in probe 1.

As illustrated in FIG. 1, in the example presented, transmission/reception element 2 is secured on a stationary component 3 of the machine tool. Machine tool 3 has a processing space which is bounded substantially by metallic walls. Transmission/reception element 2 has a housing 2.6 which includes a window 2.61 transmissive to light waves and to radio waves. Housing 2.6 having window 2.61 is hermetically sealed, so that coolants or lubricants used while processing a workpiece in the processing space are unable to penetrate into the interior of housing 2.6.

Figure 3:
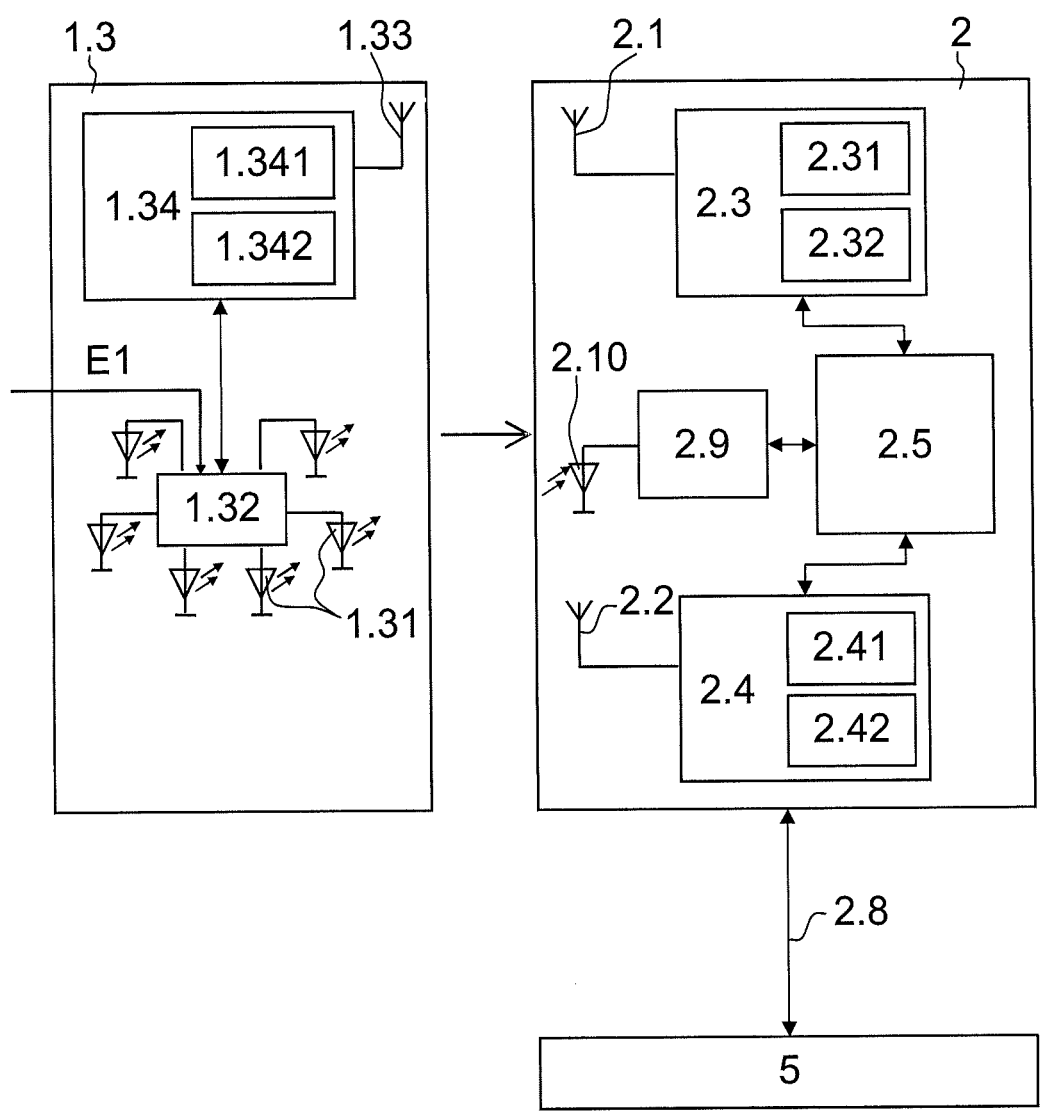
FIG. 3 schematically illustrates the transmitter/receiver unit of the probe and of the transmission/reception element.

Located within a housing 2.6 of transmission/reception element 2 behind window 2.61 is a printed-circuit board 2.7, on which an opto-electronic receiver 2.10 and two further radio transceivers 2.3, 2.4 are arranged (see FIG. 3). In the example illustrated, radio transceivers 2.3, 2.4 are arranged as two chips of the same type. They each have an electronic receiver circuit 2.31, 2.41 and an electronic transmitter circuit 2.32, 2.42.

In the exemplary embodiment illustrated, electronic receiver circuits 2.31, 2.41 include an impedance or an alternating-current resistor, a band-pass filter as well as a radio-frequency amplifier and a mixer. The signals incoming with radio frequency are able to be processed in receiver circuits 2.31, 2.41, 1.341 such that electrical signals having a lower frequency are thereupon able to be output.

Moreover, radio transceivers 2.3, 2.4 are each connected to an antenna 2.1, 2.2, antennas 2.1, 2.2 being implemented as electrically conductive structures on printed-circuit board 2.7 and being set apart from each other and oriented at an angle relative to each other. In the exemplary embodiments illustrated, radio transceivers 2.3, 2.4, 1.34 are able to emit and receive radio waves having a frequency, e.g., of $f_R$=2.4 GHz ($\lambda_R$=12.5 cm). In the exemplary embodiment illustrated, distance X between antennas 2.1, 2.2 is 6.3 cm, so that the condition $X \neq \frac{1}{2} \cdot \lambda_R$ thus applies. In general, it is preferable if antennas 2.1, 2.2 are set apart such that the following applies: $X \geq \frac{1}{2} \cdot \lambda_R$. In particular, distance X may be defined as average distance X between antennas 2.1, 2.2 oriented at an angle relative to each other, that is, in particular, distance X between the geometric centers of mass of antennas 2.1, 2.2.

Transmission/reception element 2 further includes an analog-to-digital converter 2.9 and an integrated circuit 2.5, e.g., in the form of an FPGA element which acts as a CPU. Alternatively, a trigger circuit, possibly with a controllable amplifier, may also be used in transmission/reception element 2.

Transmission/reception element 2 is connected by a multicore cable 2.8 to the power supply system for its power supply. Moreover, transmission/reception element 2 is electrically connected via cable 2.8 to subsequent electronics 5, which, for example, may be a numerical control, and to the machine tool. A bidirectional data-bus connection may be provided between transmission/reception element 2 and subsequent electronics 5.

Probe 1 is secured in a spindle of a machine tool, for example, and then switched on, that is, transferred from a battery-saving standby state to the actual measuring-operation state. In order to switch probe 1 on, in transmission/reception element 2, integrated circuit 2.5 dispatches a command to first radio transceiver 2.3, which results in the transmission of switch-on information or a switch-on command via a radio signal by its electronic transmitter circuit 2.32 and first antenna 2.1. In so doing, this radio signal (data frame) is dispatched with full power. Second radio transceiver 2.4 is inactive during this time, so that second antenna 2.2 is thus mute then and does not transmit. After the switch-on command has been sent, there is a wait to see whether an acknowledge signal, sent by probe 1, is received by first antenna 2.1.

As mentioned above, the processing space is bounded by metallic walls, so that radio signals dispatched by probe 1 or by transmission/reception element 2 are reflected by the walls. Due to interference effects, it is possible that local destructive interference of the radio waves (areas with no reception) may arise, so that the radio signals are not received there. In the same manner, transmission to certain locations may be hindered due to interference from other radio sources.

For this reason, the case may occur that the transmission of the radio signal with the switch-on information via first radio transceiver 2.3 and first antenna 2.1 fails, so that no acknowledge signal is received by first antenna 2.1. In this case, after a predefined time span (e.g., 2 ms) has elapsed, integrated circuit 2.5 outputs a command to second radio transceiver 2.4, this command causing a further radio signal with the switch-on information to be transmitted via transmitter circuit 2.42 and second antenna 2.2. Because of the selected distance between antennas 2.1, 2.2, it is extremely unlikely that probe 1 is positioned in an area without reception with respect to second antenna 2.2, as well. Therefore, probe 1 will receive the switch-on information, switch itself on and dispatch an acknowledge signal. This acknowledge signal is receivable by second antenna 2.2 and is able to be processed by receiver circuit 2.41 of second radio transceiver 2.4. If probe 1 is not permanently ready to receive in the standby state, but rather, for example, only during specific time windows, the radio signal with the switch-on information may initially be dispatched repeatedly several times by one and the same radio transceiver 2.3, 2.4 and associated antenna 2.1, 2.2, and possibly only after that, a change be made to the other radio transceiver 2.3, 2.4 with the other antenna 2.1, 2.2.

However, as soon as probe 1 has received the switch-on command and has acknowledged with the acknowledge signal, it is in measuring operation and is usually moved within a processing space of machine tool 3 or swiveled about an axis aligned orthogonally relative to longitudinal axis Z.

During measuring operation, a ready signal containing readiness information BI is transmitted continuously by radio transceiver 1.34 of probe 1 to transmission/reception element 2 to signal that the transmission of the radio signal to probe 1 is operating correctly. Readiness information BI is thus transmitted by the ready signal whose carrier wave is a radio wave. Upon reception of the readiness information by transmission/reception element 2, the measuring operation is maintained as a consequence.

To ensure perfect reception of the radio signal in transmission/reception element 2, both antennas 2.1, 2.2 and associated radio transceivers 2.3, 2.4, especially associated electronic receiver circuits 2.31, 2.41, are activated or ready to receive simultaneously during measuring operation.

Thus, if during measuring operation, probe 1 dispatches a radio signal, it is received by both antennas 2.1, 2.2 and in each case supplied simultaneously to radio transceivers 2.3, 2.4, especially to associated electronic receiver circuits 2.31, 2.41, and processed there concurrently. In particular, the radio signal received by first antenna 2.1 and the same radio signal received by second antenna 2.2 is converted in each case into digital electrical signals, and in addition, the signal strength or the level of the received radio signal is ascertained in each instance. The electrical signals or the corresponding data are passed on concurrently by identical radio transceivers 2.3, 2.4 to integrated circuit 2.5. In integrated circuit 2.5, among other things, a comparison is made as to which of the two electronic receiver circuits 2.31, 2.41 reports a higher level of the received radio signal. Integrated circuit 2.5 then assigns that radio transceiver 2.3, 2.4 which has electronic receiver circuit 2.31, 2.41 that had reported the higher level, with the dispatch of an acknowledge command. Should the levels be of equal value, a radio transceiver 2.3, 2.4 determined previously is activated. In addition, from the amount or magnitude of the received level, integrated circuit 2.5 ascertains how great the necessary transmission power must be for the acknowledge command. In response to a high received level, the transmission power is reduced. This has the advantage that a minimal danger of interference for other radio-operated systems emanates from the probe system. With the acknowledge command, transmission/reception element 2 also transmits the information about the magnitude of the ascertained (higher) level to probe 1. This information about the ascertained level is used in probe 1 for the purpose of adjusting the transmission power for the next radio signal accordingly in a manner that if the ascertained level is high, the transmission power is reduced for the next radio signal, and if the level is low, the transmission power for the next radio signal dispatched by probe 1 is increased. In particular, a non-linear adjustment, for example, a logarithmic adjustment may be performed in order to minimize the power requirement of probe 1 to an especially large degree. Accordingly, the transmission power of probe 1 may be determined such that the level to be anticipated for the next radio signal received by transmission/reception element 2 is −75 dBm, for example. Should a transmission error occur during measuring operation, the next radio signal is sent again with full transmission power.

In general, the position of probe 1 in the processing space will be such that the radio signal received by respective antennas 2.1, 2.2 will not have the same ascertained level. If probe 1 is in an unfavorable position, it may even be that, because of interference, one of antennas 2.1, 2.2 is unable to receive any radio signal. However, due to the dimensioning of distance X, the other of antennas 2.1, 2.2 will then have reception. Antenna 2.1, 2.2, together with its associated radio transceiver 2.3, 2.4, is thereupon selected to transmit a following radio signal.

Figure 4:
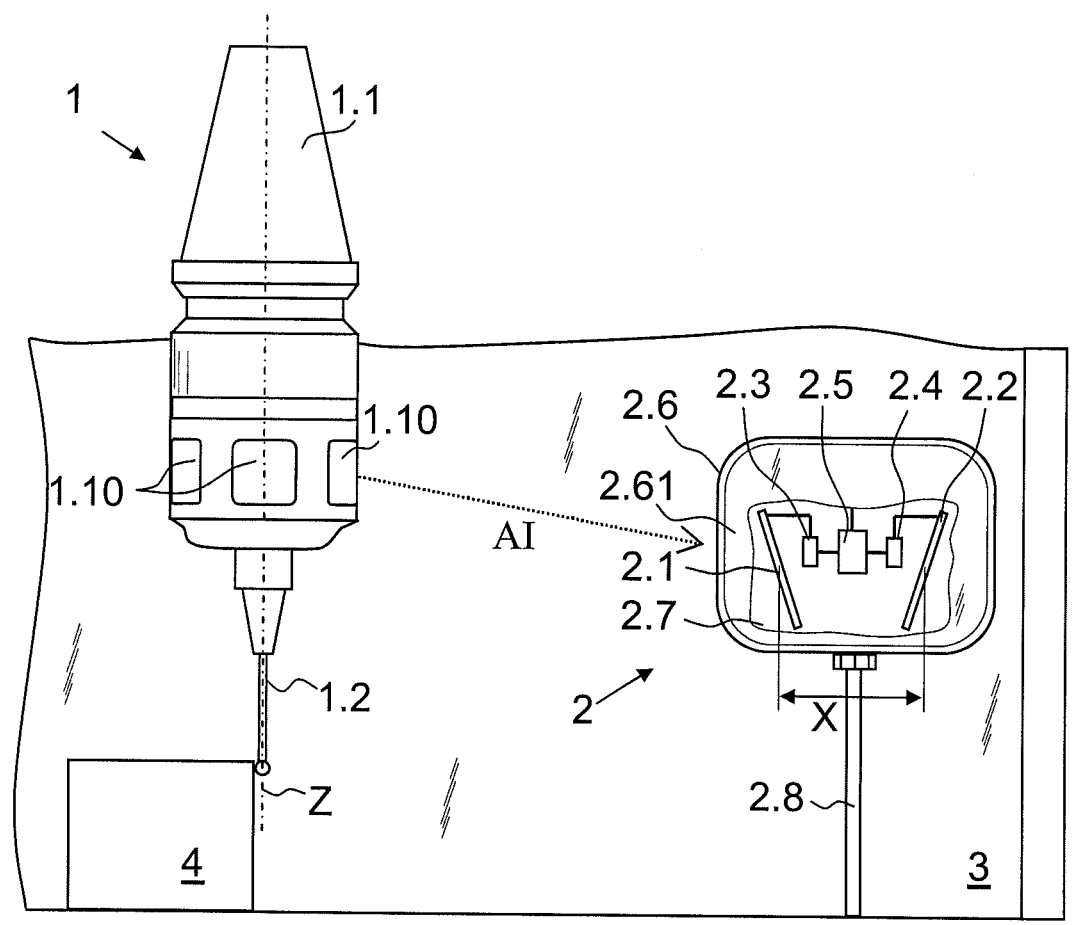
FIG. 4 is a side view of a probe system in a probe-contact position.

FIG. 4 illustrates a situation in which stylus 1.2 is contacting a workpiece 4 which is secured on a mounting table of machine tool 3. In this condition, sensor elements 1.5 generate an electrical sensor signal E1 which contains probe-contact information AI, accordingly. The occurrence of sensor signal E1 leads to the transmission of a light signal, and at the same time, an additional radio signal, both containing probe-contact information AI. Due to the form of the electronic circuits, the transmission of probe-contact information AI by the light signal is usually faster than by the radio signal.

The light signal having probe-contact information AI is transmitted to transmission/reception element 2 and is received by opto-electronic receiver 2.10. There, the light signal is converted into an electrical signal which is digitized in analog-to-digital converter 2.9 and subsequently supplied to integrated circuit 2.5, so that probe-contact information AI is processed for output to subsequent electronics 5 via cable 2.8.

Concurrently, the radio signal is dispatched by radio transceiver 1.34 in conjunction with antenna 1.33 of probe 1. Thus, probe-contact information AI is also transmitted by the radio signal to transmission/reception element 2. The radio signal is received concurrently by antennas 2.1, 2.2 and processed simultaneously by radio transceivers 2.3, 2.4, especially by receiver circuits 2.31, 2.41, independently of each other. In particular, the levels of the radio signal received by antennas 2.1, 2.2 are determined, and the radio signals are in each case converted into a digital electrical signal.

The digital signal is thereupon supplied to integrated circuit 2.5. In integrated circuit 2.5, a comparison is made as to which of the two electronic receiver circuits 2.31, 2.41 reports a higher level of the received radio signal. Integrated circuit 2.5 then assigns that radio transceiver 2.3, 2.4 which has electronic receiver circuit 2.31, 2.41 that had reported the higher level, with the dispatch of an acknowledge command.

For reasons of transmission technology, the transmission of probe-contact information AI by radio waves normally needs more time than via light waves.

As soon as probe-contact information AI is transmitted to subsequent electronics 5, the position at which the contact of workpiece 4 is taking place is determined, and at the same time, subsequent electronics 5 triggers a stop of the machine tool, so that probe 1 is no longer moved relative to workpiece 4. Usually, machine tools 3 have precise measuring devices which determine the spindle position, so that these measured values are used for determining the contact position. In the example illustrated, normally probe-contact information AI, which is transmitted via light waves, triggers the indicated measures in subsequent electronics 5. Nevertheless, probe-contact information AI is also transmitted via a radio signal to confirm that a probing process has actually taken place. Consequently, the probe system is configured such that probe-contact information AI is able to be output redundantly in succession by transmission/reception element 2 to subsequent electronics 5.

However, it may also occur, for example, that due to interference with the light signal, for instance, by an opaque obstacle in the path of the light waves, the transmission of probe-contact information AI via the light signal fails. In this case, probe-contact information AI transmitted via the radio signal is able to trigger the stop and the measurement. Increased operational reliability is thus achieved once again for this case, because a stop of machine tool 3 is already triggered when only one of the two antennas 2.1, 2.2 receives the radio signal with probe-contact information AI. Since reliable measuring operation is also possible without the transmission of information via light waves, this type of transmission may also be omitted in order to simplify the probe system.

Besides the switch-on information, readiness information BI or probe-contact information AI described, further information such as parameter information, authentication information, setting information, etc., is also transmittable via radio signals.

What is claimed is:
1. A probe system, comprising:
   a probe having a stylus and a sensor, the sensor adapted to generate a sensor signal in accordance with contact of the stylus; and
   a transmission/reception device;
   wherein information is wirelessly transmittable between the probe and the transmission/reception device via a radio signal;
   wherein the transmission/reception device or the probe includes two antennas, set apart from each other, adapted to receive the radio signal;

wherein the transmission/reception device or the probe is adapted to process concurrently the information received by the two antennas via the radio signal; and wherein the antennas are adapted to alternately transmit radio signals, so that the radio signal is transmittable by only one antenna, while the other antenna is mute.

2. The probe system according to claim 1, wherein the antennas are arranged at an angle relative to each other.

3. The probe system according to claim 1, wherein each of the two antennas is connected to an electronic receiver circuit adapted to process concurrently the information received.

4. The probe system according to claim 3, wherein the electronic receiver circuits are arranged on two electronic modules, each electronic module including an electronic transmitter circuit.

5. The probe system according to claim 1, wherein the antennas are arranged in a closed housing.

6. The probe system according to claim 1, wherein the information includes readiness information and/or probe-contact information.

7. The probe system according to claim 1, wherein the information is transmittable in unsynchronized manner.

8. A probe system, comprising:
a probe having a stylus and a sensor, the sensor adapted to generate a sensor signal in accordance with contact of the stylus; and
a transmission/reception device;
wherein information is wirelessly transmittable between the probe and the transmission/reception device via a radio signal;
wherein the transmission/reception device or the probe includes two antennas, set apart from each other, adapted to receive the radio signal;
wherein the transmission/reception device or the probe is adapted to process concurrently the information received by the two antennas via the radio signal;
wherein a first level of the radio signal as received by a first antenna is ascertainable, a second level of the radio signal as received by a second antenna is ascertainable, and the probe system further comprises a comparator adapted to compare the first level and the second level, the antennas being adapted to alternately transmit the radio signals, so that the radio signal is transmittable by only one antenna, while the other antenna is mute, the transmitting antenna corresponding to the antenna that delivers the higher level ascertained by the comparison.

9. A method for operating a probe system, including a probe and a transmission/reception device, the probe having a stylus and a sensor adapted to generate a sensor signal in accordance with contact of the stylus, the transmission/reception device or the probe having two antennas, set apart from each other, adapted to receive the radio signal, comprising:
wirelessly transmitting information between the probe and the transmission/reception device by a radio signal; and
concurrently processing the information received by the two antennas via the radio signal;
wherein the transmitting including alternately transmitting the radio signals by the two antennas, so that the radio signal is transmitted by only one antenna, while the other antenna is mute.

10. The method according to claim 9, wherein the information includes readiness information and/or probe-contact information, the transmitting including transmitting the information by the probe to the transmission/reception device.

11. The method according to claim 9, wherein the information is transmitted in unsynchronized manner.

12. A method for operating a probe system, including a probe and a transmission/reception device, the probe having a stylus and a sensor adapted to generate a sensor signal in accordance with contact of the stylus, the transmission/reception device or the probe having two antennas, set apart from each other, adapted to receive the radio signal, comprising:
wirelessly transmitting information between the probe and the transmission/reception device by a radio signal;
concurrently processing the information received by the two antennas via the radio signal;
ascertaining a first level of the radio signal as received by a first antenna;
ascertaining a second level of the radio signal as received by a second antenna;
comparing the first level and the second level;
alternately transmitting the radio signals by the two antennas, so that the radio signal is transmitted by only one antenna, while the other antenna is mute; and
determining, as the transmitting antenna, the antenna that delivers a higher level as ascertained from the comparison.

13. The method according to claim 12, further comprising setting a transmission power for the transmitting antenna as a function of a magnitude of the ascertained level of the radio signal received by the same antenna, such that the transmission power is reduced in response to a high ascertained level.

14. A method for operating a probe system, including a probe and a transmission/reception device, the probe having a stylus and a sensor adapted to generate a sensor signal in accordance with contact of the stylus, the transmission/reception device or the probe having two antennas, set apart from each other, adapted to receive the radio signal, comprising:
wirelessly transmitting information between the probe and the transmission/reception device by a radio signal; and
concurrently processing the information received by the two antennas via the radio signal; and further comprising, by the transmission/reception device:
ascertaining a first level of the radio signal as received by a first antenna;
ascertaining a second level of the radio signal as received by a second antenna;
comparing the first level and the second level;
transmitting radio signals to the probe by one antenna, the radio signal transmitted to the probe including information relating to a magnitude of a higher of the ascertained levels; and
setting a transmission power of the probe as a function of the magnitude.

* * * * *